(12) United States Patent
Lee et al.

(10) Patent No.: US 10,472,061 B2
(45) Date of Patent: Nov. 12, 2019

(54) PROPELLER-LESS DRONE USING FLOW OF WIND

(71) Applicant: Jin-Woo Lee, Incheon (KR)

(72) Inventors: Jin-Woo Lee, Incheon (KR); Hwan-Tae Kim, Gyeonggi-do (KR)

(73) Assignees: Keun-Young Kim, Bucheon-si (KR); Si-Eun Kim, Bucheon-si (KR)

( * ) Notice: Subject to any disclaimer, the term of this patent is extended or adjusted under 35 U.S.C. 154(b) by 308 days.

(21) Appl. No.: 15/296,682

(22) Filed: Oct. 18, 2016

(65) Prior Publication Data
US 2017/0113798 A1    Apr. 27, 2017

(30) Foreign Application Priority Data
Oct. 26, 2015  (KR) .................. 10-2015-0148890

(51) Int. Cl.
*B64C 39/02*    (2006.01)
*B64C 39/06*    (2006.01)

(52) U.S. Cl.
CPC .......... *B64C 39/024* (2013.01); *B64C 39/064* (2013.01); *B64C 2201/027* (2013.01); *B64C 2201/042* (2013.01); *B64C 2201/10* (2013.01)

(58) Field of Classification Search
CPC . B64C 29/0016; B64C 29/0025; B64C 39/06; B64C 39/064; B64C 2201/10; B64C 2201/108; B64C 2230/28; B64D 27/02
See application file for complete search history.

(56) References Cited

U.S. PATENT DOCUMENTS

| | | | | | |
|---|---|---|---|---|---|
| 3,061,243 | A | * | 10/1962 | Simon | B64C 29/0025 244/23 B |
| 3,176,934 | A | * | 4/1965 | Kappus | B64C 29/0025 244/12.3 |
| 3,267,667 | A | * | 8/1966 | Erwin | B64C 29/0016 244/23 B |
| 3,273,339 | A | * | 9/1966 | Borysthen-Tkacz | B64C 29/0025 239/265.29 |
| 3,697,020 | A | * | 10/1972 | Thompson | B64C 39/001 244/12.2 |
| 3,785,592 | A | * | 1/1974 | Kerruish | B64C 39/064 244/12.2 |
| 5,312,069 | A | * | 5/1994 | Bollinger | F02K 3/068 244/12.3 |
| 8,128,019 | B2 | * | 3/2012 | Annati | B64C 27/20 244/12.3 |

(Continued)

FOREIGN PATENT DOCUMENTS

| KR | 1020150090539 | 8/2015 |
|---|---|---|
| KR | 1020150107664 | 9/2015 |

(Continued)

*Primary Examiner* — Joseph W Sanderson
(74) *Attorney, Agent, or Firm* — Studebaker & Brakett PC

(57) ABSTRACT

The present disclosure relates to a drone with a wind guide, including a body, a single central inlet unit accommodated in the body, and configured to introduce wind therein, at least two pairs of wind guides, and at least four connecting ducts. Each wind guide is spaced apart from the body, and each connecting duct is connected with a respective wind guide of the at least two pairs of wind guides. The connecting duct is configured to transmit the wind introduced from the single central inlet unit to the connected respective wind guide.

14 Claims, 7 Drawing Sheets

(56) References Cited

U.S. PATENT DOCUMENTS

| | | | | |
|---|---|---|---|---|
| 8,177,527 | B2* | 5/2012 | Ishiba | B64C 11/001 |
| | | | | 415/199.4 |
| 8,646,721 | B2* | 2/2014 | Chapman | B64C 27/20 |
| | | | | 239/265.39 |
| 9,199,733 | B2* | 12/2015 | Keennon | B64C 27/12 |
| 2010/0147993 | A1* | 6/2010 | Annati | B64C 27/20 |
| | | | | 244/12.2 |
| 2011/0155860 | A1* | 6/2011 | Chapman | B64C 27/20 |
| | | | | 244/23 A |
| 2014/0138477 | A1* | 5/2014 | Keennon | B64C 27/12 |
| | | | | 244/17.23 |
| 2017/0057621 | A1* | 3/2017 | Evulet | B64C 9/38 |
| 2017/0240275 | A1* | 8/2017 | Evulet | B64C 9/38 |

FOREIGN PATENT DOCUMENTS

| | | | | |
|---|---|---|---|---|
| KR | 1020170116814 | * | 10/2017 | B64C 39/024 |
| WO | WO-2017034359 A1 | * | 3/2017 | B64C 39/02 |

* cited by examiner

PROPELLER-LESS DRONE USING FLOW OF WIND

CROSS REFERENCE

This application claims a foreign priority under 35 USC 119 to Korean Patent Application No. 10-2015-0148890, filed 26 Oct. 2015, with the Korean Intellectual Property Office.

BACKGROUND

The present invention relates to a drone with a wind guide part. More particularly, the present invention relates to a drone with a wind guide part, which is configured such that it can lift off or aviate using the flow of wind.

Generally, a drone is simply defined as an 'aircraft having no pilot'. The drone is also referred to as an UAV (Unmanned Aerial Vehicle) in that it does not have any people therein and is remotely controlled from the ground. Such a drone has been proposed to function as a target substituting for an enemy aircraft in military practice drills utilizing planes, anti-aircraft artillery, or missiles. Recently, the size of the drone used for military purposes has gradually shrunken in size and is now highly customized. Such drone technology has now carried over to the commercial sector. Particularly, a flying drone designed in a type of a helicopter equipped with a multi-rotor is widely used in various application fields, such as aerial photography, broadcasting image making, aerospace rescue, delivery of goods, surveillance, survey, disease prevention, or leisure activities.

FIG. 1 is a view illustrating a conventional drone. Referring to FIG. 1, the conventional drone 1 includes a body 10, a control part (not shown) coupled to the body 10, four frames 20 radially extending from a center of the body 10, and a propelling unit coupled to each frame 20. The propelling unit includes an engine (not shown) that is driven in response to a signal received from the control part, and a propeller 30 that is coupled to the engine and generates a vertical lift force when the propeller is rotated by the engine. Further, the drone 1 is remotely controlled by driving the engine and the propeller 30, in response to the control signal transmitted from a controller (not shown).

Such a conventional drone may possibly crash or collide with an object due to a user's inexperienced piloting or jamming. Since the propeller is rotated at very high speed, crashing or collision of the drone leads to an accident due to the contact of the propeller, and maintenance cost is undesirably increased due to the damage to the propeller. Further, since each propeller requires the engine, a considerable level of noise is generated.

SUMMARY OF THE INVENTION

Accordingly, the present invention has been made keeping in mind the above problems occurring in the related art, and an object of the present invention is to provide a drone with a wind guide part, which is configured such that it can lift off or aviate using the flow of wind.

Another object of the present invention is to provide a drone with a wind guide part that does not use a propeller, thus preventing an accident due to the contact of the propeller, saving maintenance cost, and reducing weight and noise.

In order to accomplish the above objects, the present invention provides a drone with a wind guide part, the drone including a body; an inlet unit accommodated in the body to introduce wind therein; at least one wind guide part spaced apart from the body; and a connecting duct connecting the body with the wind guide part to cause the wind introduced from the inlet unit to flow into the wind guide part, wherein the wind guide part has a lift force to discharge the wind moved from the connecting duct and thereby allow the body to fly.

The wind guide part may include a plurality of wind guide parts, the wind guide parts extending radially from the body to be spaced apart from each other.

The wind guide part may include a supply part receiving wind from the connecting duct; a discharge part discharging the wind supplied to the supply part; and a wind passage formed between the supply part and the discharge part to allow the wind to flow therethrough.

The wind guide part may be formed in a ring shape, and may include an outer circumferential part provided on an outer circumference thereof, an inner circumferential part provided on an inner circumference thereof, an upper side part provided on an upper portion between the outer circumferential part and the inner circumferential part, and a lower side part provided on a lower portion between the outer circumferential part and the inner circumferential part, and the supply part may be formed on the outer circumferential part, the discharge part may be formed on the inner circumferential part, and the wind passage may be provided between the outer circumferential part and the inner circumferential part.

The inner circumferential part may include a first inner circumferential part formed in a direction from the upper side part to the lower side part, and a second inner circumferential part formed in a direction from the lower side part to the upper side part, and an upper portion of the second inner circumferential part extends inside the first inner circumferential part, and the discharge part may be formed at a position where the first inner circumferential part faces the second inner circumferential part.

The second inner circumferential part may be formed to be inclined towards the outer circumferential part, thus allowing wind to be obliquely discharged from the discharge part according to an inclination angle of the second inner circumferential part.

The inclination angle of the second inner circumferential part may be formed such that it may be closer to the outer circumferential part, as the second inner circumferential part may approach the supply part.

A lower end of the first inner circumferential part may be formed to be closer to the second inner circumferential part.

The wind guide part may be formed in a ring shape, and may include an outer circumferential part provided on an outer circumference thereof, an inner circumferential part provided on an inner circumference thereof, an upper side part provided on an upper portion between the outer circumferential part and the inner circumferential part, a lower side part provided on a lower portion between the outer circumferential part and the inner circumferential part, and the wind passage provided in a space between the outer circumferential part and the inner circumferential part, and the supply part may be formed on the outer circumferential part, and the discharge part may be formed at a position where the supply part of the outer circumferential part may not be formed or may be formed on the lower side part.

The inlet unit may include an inlet fan generating wind; and an inlet motor rotating the inlet fan.

The drone may further include a control part provided in the body to control the inlet unit; and a controller wirelessly transmitting a manipulation signal to the control part.

The connecting duct or the wind guide part may be formed to be tiltable.

An interior of the body may be partitioned into a plurality of independent spaces, the inlet unit may comprise a plurality of inlet units to be located in the respective spaces, the wind guide part may comprise a plurality of wind guide parts that may be arranged outside the respective spaces to be spaced apart therefrom, and the connecting duct may comprise a plurality of connecting ducts to connect the respective spaces with the wind guide parts.

As described above, the present invention provides a drone, which has a lift force by wind discharged towards the ground through a connecting duct and a wind guide part, so that the drone may lift off or aviate using the flow of the wind.

Further, the present invention provides a drone, which may aviate without a propeller, thus preventing an accident due to the contact of the propeller, saving maintenance cost, and reducing weight and noise.

Furthermore, the present invention provides a drone, in which a second inner circumferential part of a wind guide part is obliquely formed towards an outer circumferential part, so that wind discharged from a discharge part flares out from a body according to an inclination angle of the second inner circumferential part, and thereby the body may fly more stably.

Further, the present invention provides a drone, in which a lower end of a first inner circumferential part is formed to be closer to a second inner circumferential part, so that a discharge part located between the first inner circumferential part and the second inner circumferential part is formed to be narrower towards the lower end of the first inner circumferential part, and thereby the speed of the wind passing through the discharge part is gradually increased, and consequently, a body has a stronger lift force.

Furthermore, the present invention provides a drone, in which a plurality of inlet units is provided to supply wind to a plurality of wind guide parts, so that each wind guide part may stably discharge strong wind to a lower position.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Hereinafter, drones with wind guide parts according to preferred embodiments of the present invention will be described in detail.

Figure 1:
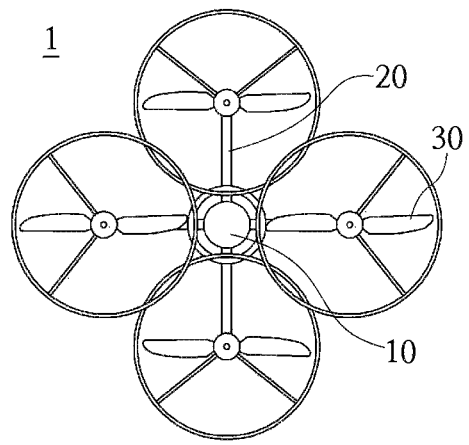
FIG. 1 is a view illustrating a conventional drone.
Figure 2:
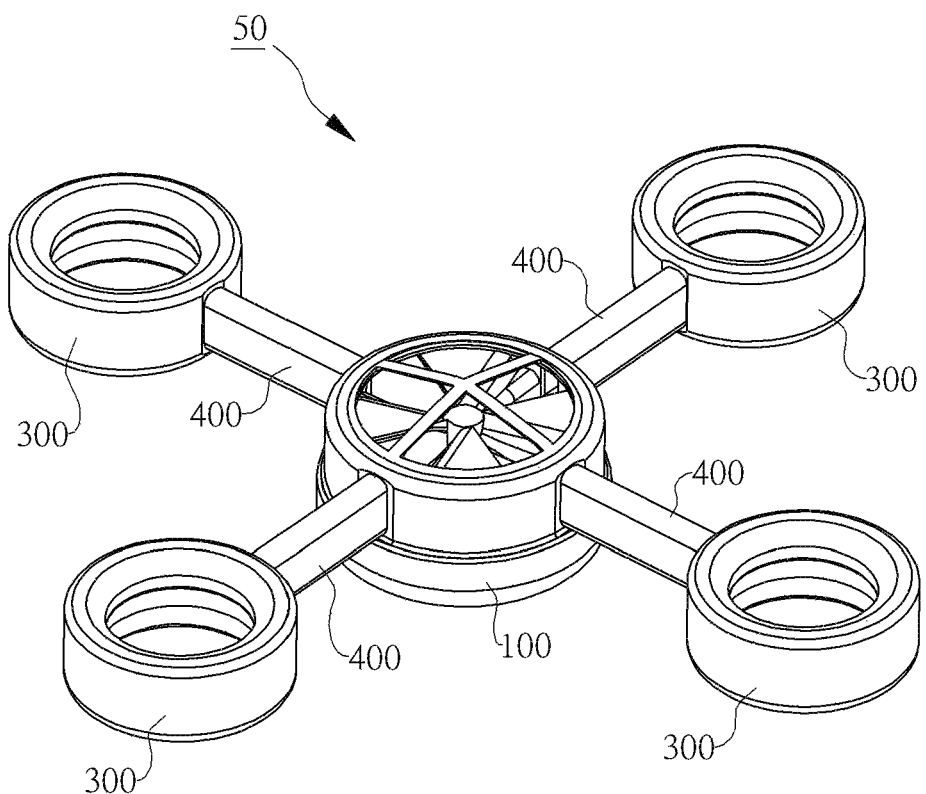
FIG. 2 is a view schematically illustrating a drone with a wind guide part according to a first preferred embodiment of the present invention.
Figure 3:
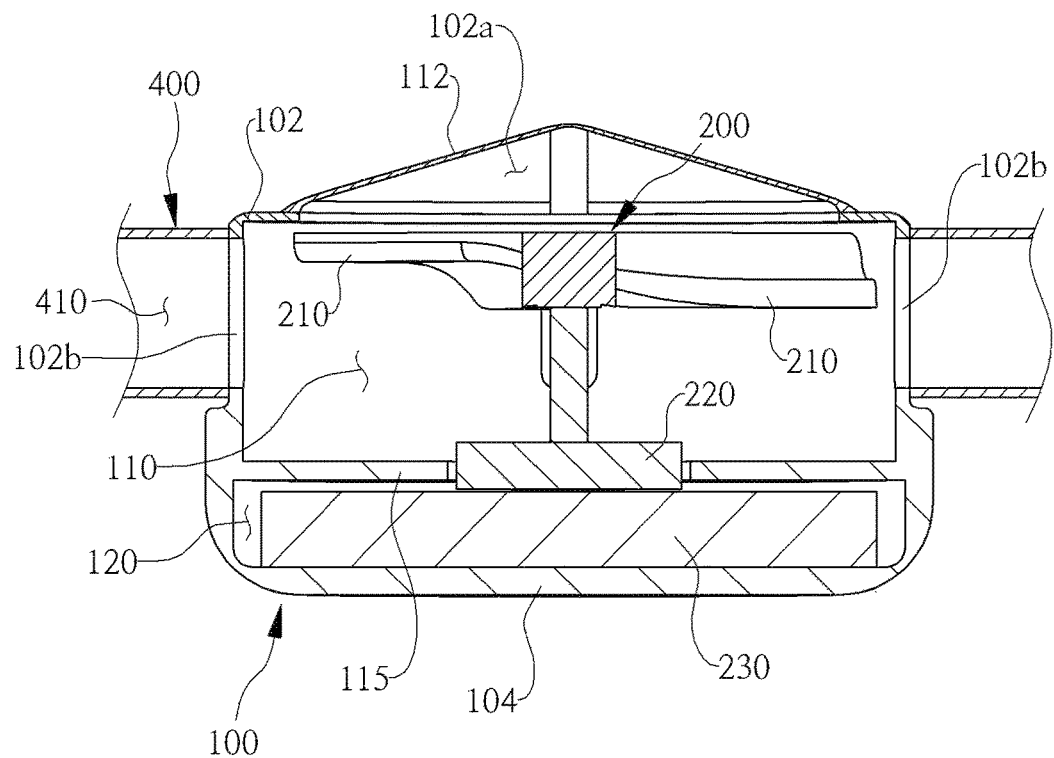
FIG. 3 is view schematically illustrating an interior of a body of the drone with the wind guide part according to the first preferred embodiment of the present invention.

FIG. 2 is a view schematically illustrating a drone with a wind guide part according to a first preferred embodiment of the present invention, and FIG. 3 is view schematically illustrating an interior of a body of the drone with the wind guide part according to the first preferred embodiment of the present invention.

Referring to FIGS. 2 and 3, the drone 50 with the wind guide part 300 according to the preferred embodiment of the present invention is intended to lift off or aviate using the flow of wind, and includes a body 100, an inlet unit 200, wind guide parts 300, and connecting ducts 400.

The body 100 includes a first body 102 that has a space to accommodate therein the inlet unit 200 that will be described below, and a second body 104 that covers an open bottom of the first body 102. The first and second bodies 102 and 104 may be integrally or separately formed. An interior of the first body 102 is partitioned into a first accommodation part 110 located at an upper position and a second accommodation part 120 located at a lower position by a partition wall 115. A top of the first accommodation part 110 is opened to form an inlet part 102a.

The inlet unit 200 includes an inlet fan 210, an inlet motor 220, and a battery 230. The inlet fan 210 and the inlet motor 220 are accommodated in the first accommodation part 110, while the battery 230 is accommodated in the second accommodation part 120. Further, a plurality of supports 112 is formed in the inlet part 102a of the first accommodation part 110 to support the inlet fan 210 and thereby prevent it from being removed. If the inlet motor 220 rotates the inlet fan 210 using the power of the battery 230, outside air flows through a space between the supports 112 into the first accommodation part 110, so that air flow, namely, wind is generated. The wind moves to the connecting ducts 400 that will be described below. By controlling the rotating speed of the inlet fan 210 and adjusting the amount of wind supplied to the wind guide parts 300 that will be described below, the body 100 may be moved up or down.

The wind guide parts 300 may be radially arranged along an outer circumference of the body 100 to be spaced apart from each other. A plurality of wind guide parts, for example, four wind guide parts may be provided. The connecting ducts 400 connect the body 100 with the wind guide parts 300 to render wind supplied to the body 100 to be moved to the wind guide parts 300. The wind guide parts 300 and the connecting ducts 400 will be described in detail with reference to FIG. 4.

Figure 4:
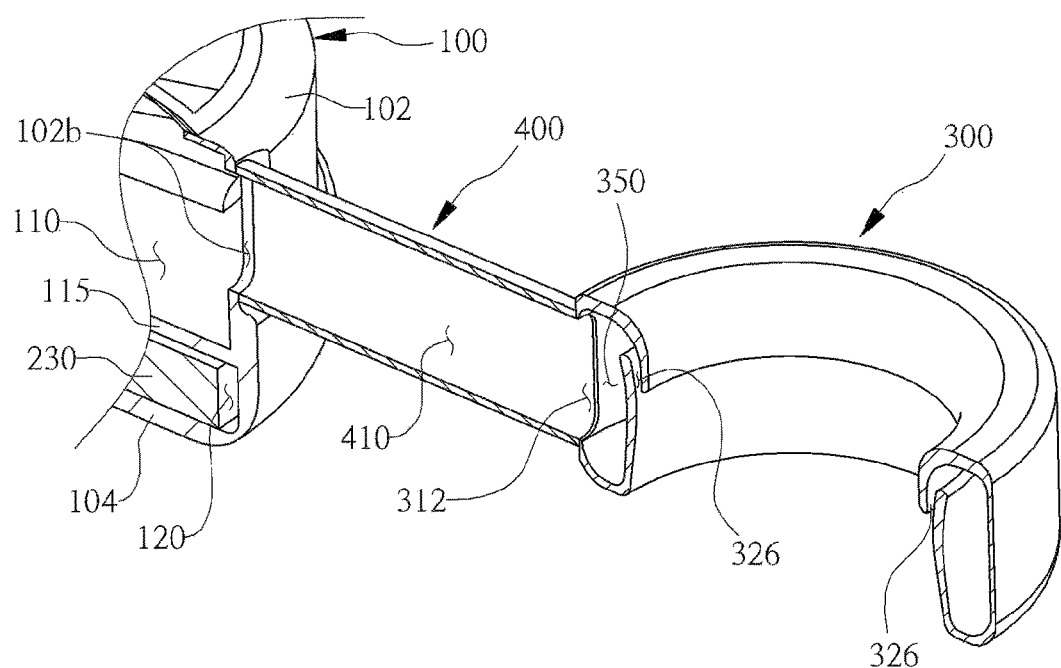
FIG. 4 is view schematically illustrating a connecting duct of the drone with the wind guide part according to the first preferred embodiment of the present invention.
Figure 5:
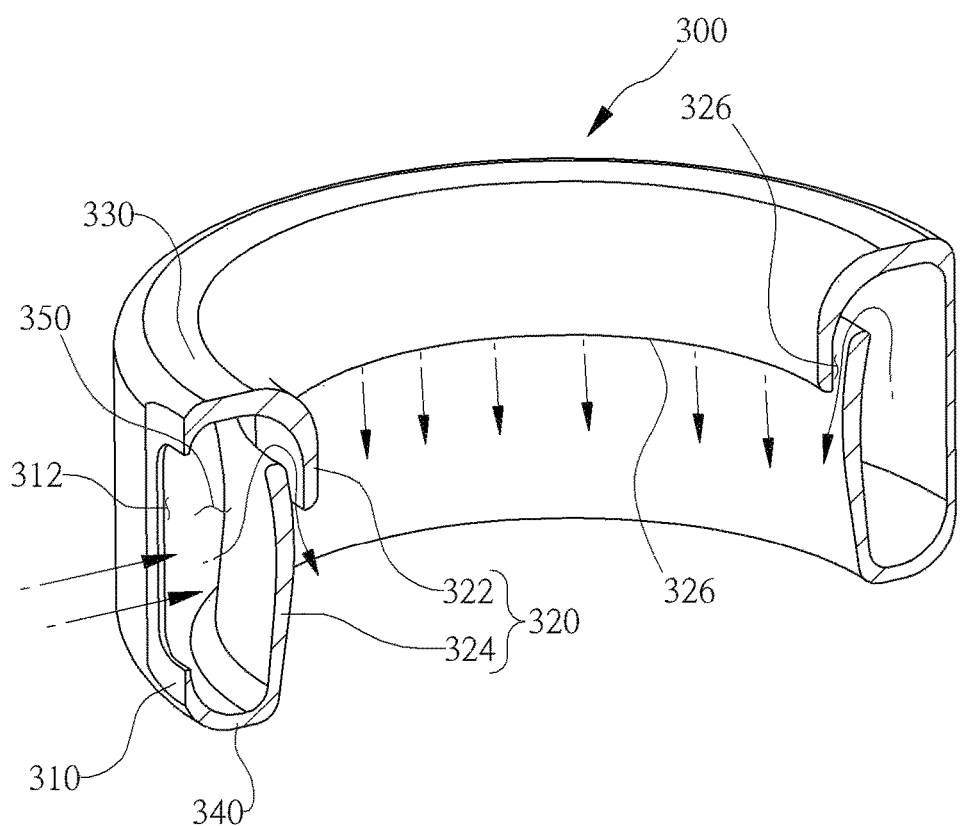
FIG. 5 is view schematically illustrating the wind guide part included in the drone with the wind guide part according to the first preferred embodiment of the present invention.

FIG. 4 is view schematically illustrating the connecting duct of the drone with the wind guide part according to the first preferred embodiment of the present invention, and FIG. 5 is view schematically illustrating the wind guide part included in the drone with the wind guide part according to the first preferred embodiment of the present invention.

Referring to FIGS. 4 and 5, a plurality of connecting ducts 400 is provided to correspond to the number of the wind guide parts 300, and extends in a longitudinal direction to connect the body 100 with the wind guide parts 300. The connecting duct 400 defines therein a connecting path 410 to allow wind to flow in the longitudinal direction, and the connecting path 410 is open at both ends thereof, so that the wind introduced into the first accommodation part 110 of the body 100 flows through the connecting path 410 to the wind guide part 300. To this end, an outlet part 102b is formed at a junction between the body 100 and the connecting duct 400 to allow wind from the body 100 to be discharged to the connecting path 410.

The wind guide part 300 receives wind from the connecting duct 400 and then discharges the wind to a lower position, and includes a supply part 312 that is connected with the connecting duct 400 to be supplied with the wind, a discharge part 326 that discharges the wind supplied to the supply part 312, and a wind passage 350 that is formed between the supply part 312 and the discharge part 326 to allow wind to flow therethrough. In detail, the wind guide part 300 is formed in a ring shape, and includes an outer circumferential part 310 that is provided on an outer circumference thereof, an inner circumferential part 320 that is provided on an inner circumference thereof, an upper side part 330 that is provided on an upper portion between the outer circumferential part 310 and the inner circumferential part 320, and a lower side part 340 that is provided on a lower portion between the outer circumferential part 310 and the inner circumferential part 320. Further, the supply part 312 is formed through a junction between the outer circumferential part 310 and the connecting duct 400 to communicate with the connecting duct 400, the discharge part 326 is formed on the inner circumferential part 320 to face the ground, and the wind passage 350 is provided in a space between the outer circumferential part 310 and the inner circumferential part 320. Here, the inner circumferential part 320 includes a first inner circumferential part 322 formed in a direction from the upper side part 330 to the lower side part 340, and a second inner circumferential part 324 formed in a direction from the lower side part 340 to the upper side part 330, and an upper portion of the second inner circumferential part 324 extends inside the first inner circumferential part 322. Further, the discharge part 326 is formed at a position where the first inner circumferential part 322 faces the second inner circumferential part 324.

As such, while the wind supplied through the connecting duct 400 to the wind guide part 300 flows to the discharge part 326, the wind flow direction is changed towards the ground, and the body 100 has a lift force by the wind discharged towards the discharge part 326. Thus, the body 100 may vertically lift off or aviate using the flow of the wind.

Meanwhile, the second inner circumferential part 324 may be formed to be inclined towards the outer circumferential part 310, thus allowing wind to be obliquely discharged from the discharge part 326 according to an inclination angle of the second inner circumferential part 324. Further, the inclination angle of the second inner circumferential part 324 is formed such that it is closer to the outer circumferential part 310, as the second inner circumferential part approaches the supply part 312. As a result, the wind discharged from the discharge part 326 is discharged to flare out from the body 100 according to the inclination angle of the second inner circumferential part 324, thus allowing the body 100 to be more stably moved up and down.

Further, a lower end of the first inner circumferential part 322 may be formed to be closer to the second inner circumferential part 324, so that the discharge part 326 located between the first inner circumferential part 322 and the second inner circumferential part 324 is formed to be narrower towards the lower end of the first inner circumferential part 322. Thus, the speed of the air passing through the discharge part 326 is gradually increased, so that the body 100 has a stronger lift force.

Furthermore, the connecting duct 400 or the wind guide part 300 may be formed to be tiltable. To this end, a tilting unit (not shown) may be provided between the body 100 and the connecting duct 400, or between the connecting duct 400 and the wind guide part 300. The tilting unit is intended to adjust an angle of the connecting duct 400 or the wind guide part 300 using the rotation of a motor, for example. Since the tilting unit configured to tilt a wing, a propeller, or the like in an aircraft, a drone, or the like is generally known to those skilled in the art, a detailed description thereof will be omitted herein. As such, if the connecting duct 400 or the wind guide part 300 is tilted, it is possible to control the flying direction of the body 100 in all directions.

Further, a gravity sensor or the like may be provided in the body 100 to convert a gradient for a gravity direction into an electrical signal, and a Gyro sensor, an acceleration sensor, a geomagnetic sensor, or the like may be further provided. Various sensing signals detected by these sensors are transmitted to a control part (not shown) that is provided in the body 100, and a control part outputs a control signal to control the tilting unit or the inlet motor 220 of the inlet unit 200 based on the sensing signal, thus controlling the flying or posture of the body 100. Further, the control part may receive a manipulation signal that is transmitted wirelessly from a controller (not shown), which will be described below, and may output a control signal to control the tilting unit or the inlet motor 220 of the inlet unit 200, thus controlling the flying or posture of the body 100. Here, the controller is configured to be manipulated by a user himself and wirelessly transmit the manipulation signal to the control part. Since such a controller adopts a general configuration for remotely or automatically controlling the drone 50, a detailed description thereof will be omitted herein.

In the embodiment of the present invention, the discharge part 326 is configured to be formed on the inner circumferential part 320 of the wind guide part 300. However, without being limited to such a configuration, the discharge part 326 may be formed on the outer ci Hereinafter, an operation of the drone with the wind guide part according to the first preferred embodiment of the present invention will be described.

Figure 6:
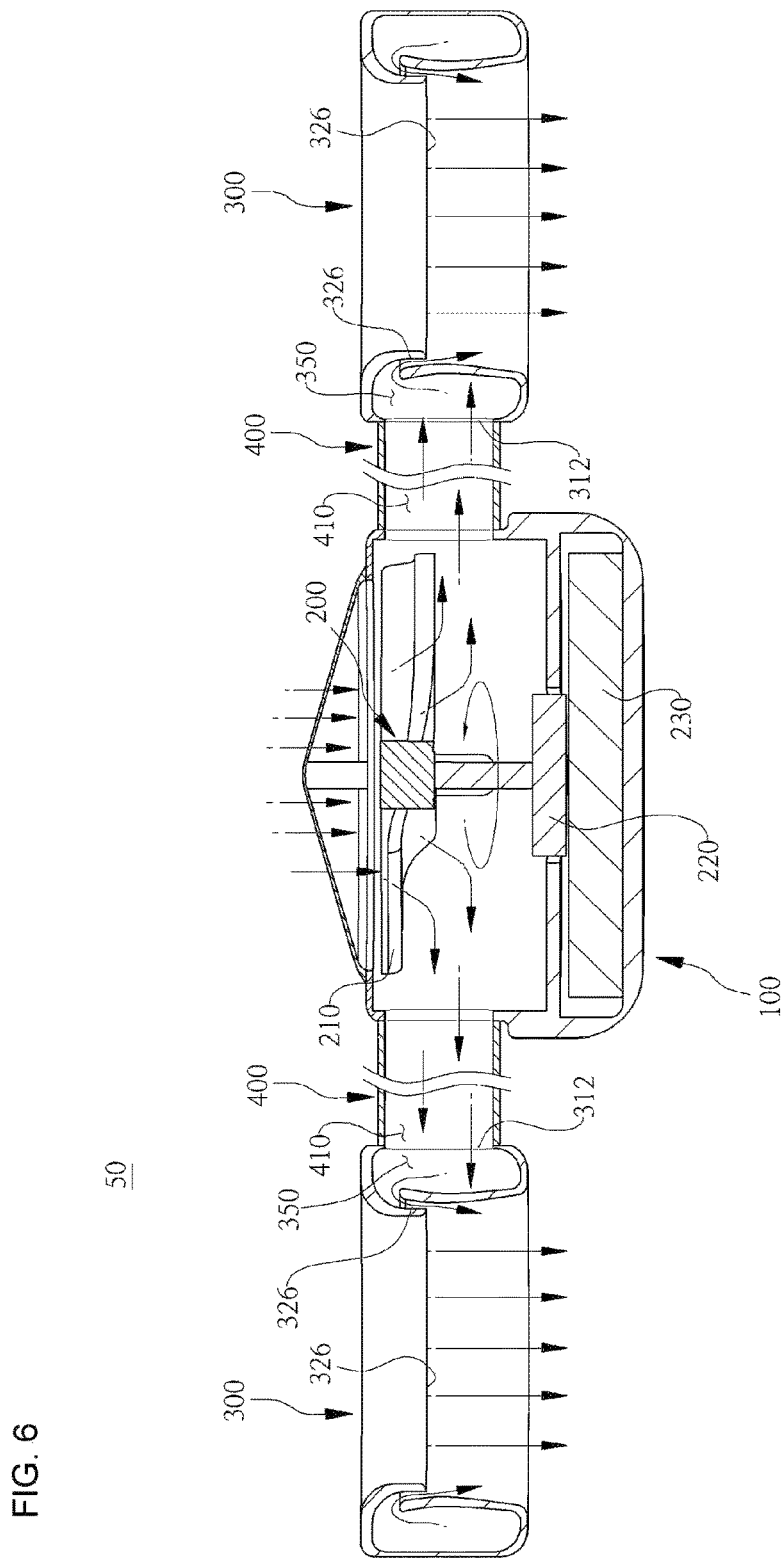
FIG. 6 is view schematically illustrating an operation of the drone with the wind guide part according to the first preferred embodiment of the present invention.
Figure 7:
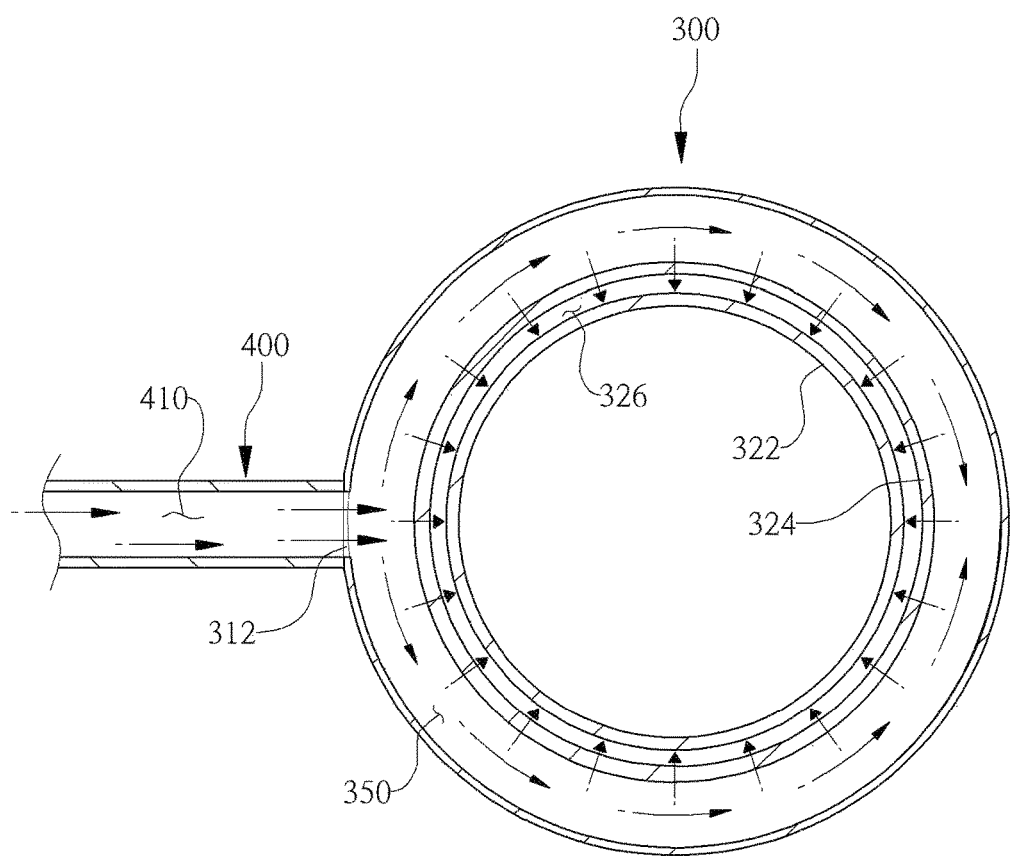
FIG. 7 is view schematically illustrating the flow of wind moved by the wind guide part of the drone with the wind guide part according to the first preferred embodiment of the present invention.

FIG. 6 is view schematically illustrating the operation of the drone with the wind guide part according to the first preferred embodiment of the present invention, and FIG. 7 is view schematically illustrating the flow of wind moved by the wind guide part of the drone with the wind guide part according to the first preferred embodiment of the present invention.

Referring to the drawings, in order to operate the drone 50 according to the preferred embodiment of the present invention, a user manipulates a controller (not shown), and the controller transmits the manipulation signal to the control part (not shown) provided in the body 100. Then, the control part controls the inlet motor 220 of the inlet unit 200, thus rotating the inlet fan 210. Then, while the air outside the body 100 flows into the body 100, the air flow, namely, the wind is generated. After the wind passes through the inlet unit 200, the wind is supplied through the supply part 312 of the wind guide part 300 to the wind passage 350 of the wind guide part 300. Further, the wind supplied to the wind passage 350 is discharged through the discharge part 326 to a lower portion of the wind guide part 300. At this time, the body 100 has a lift force, so that flying is possible.

Figure 8:
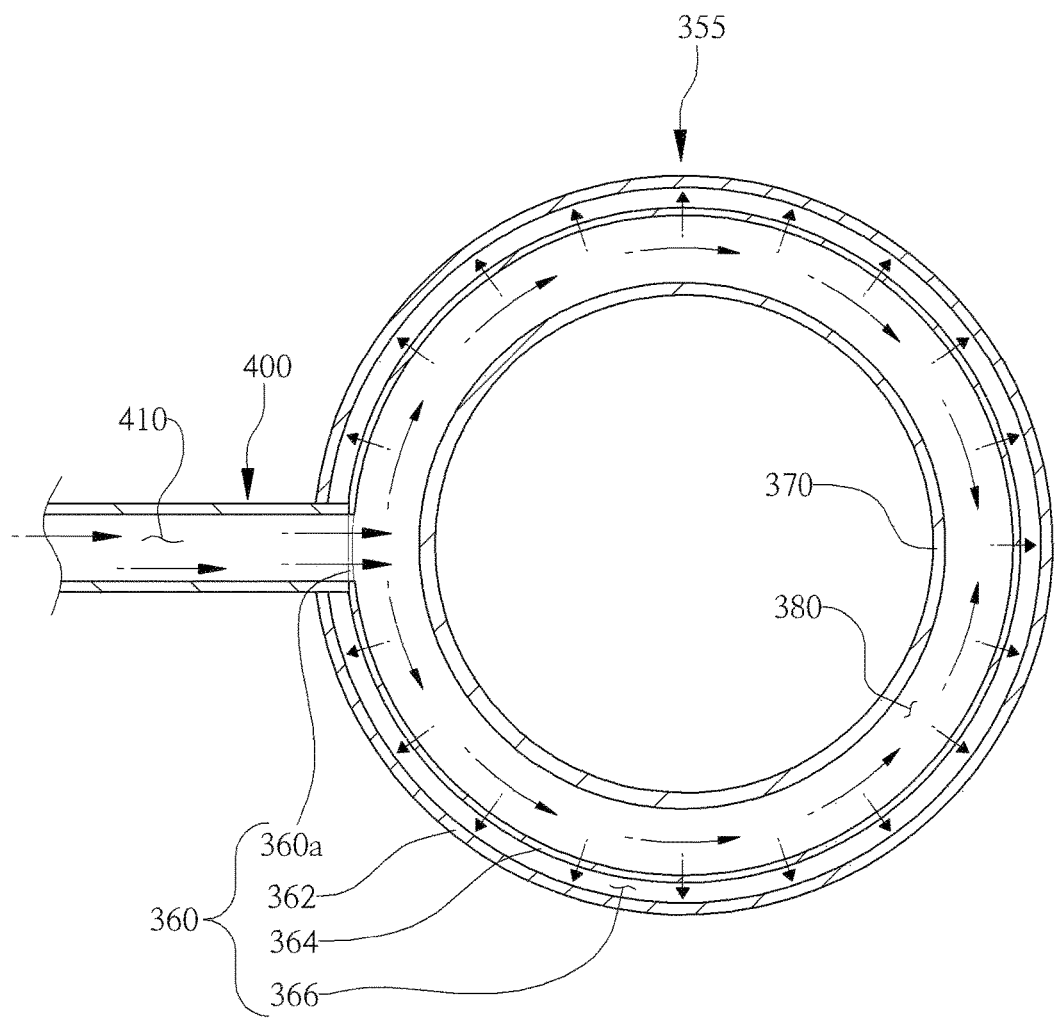
FIG. 8 is a view schematically illustrating a drone with a wind guide part according to a second preferred embodiment of the present invention.

FIG. 8 is a view schematically illustrating a drone with a wind guide part according to a second preferred embodiment of the present invention.

Referring to FIG. 8, the drone with the wind guide part according to the second preferred embodiment of the present invention is different from the first embodiment in terms of the discharge part 366 of a wind guide part 355. That is, the wind guide part 355 receives wind from the connecting duct 400 (see FIG. 7) and then discharges the wind to a lower portion. The wind guide part includes a supply part 360a that is connected with the connecting duct 400 to be supplied with wind, a discharge part 366 that discharges the wind supplied to the supply part 360a, and a wind passage 380 that is formed between the supply part 360a and the discharge part 366 to allow the wind to flow therethrough. In detail, the wind guide part 355 is formed in a ring shape, and includes an outer circumferential part 360 that is provided on an outer circumference thereof, an inner circumferential part 370 that is provided on an inner circumference thereof, an upper side part (not shown) that is provided on an upper portion between the outer circumferential part 360 and the inner circumferential part 370, and a lower side part (not shown) that is provided on a lower portion between the outer circumferential part 360 and the inner circumferential part 370. Further, the supply part 360a is formed through a junction between the outer circumferential part 360 and the connecting duct 400 to communicate with the connecting duct 400, and the wind passage 380 is provided in a space between the outer circumferential part 360 and the inner circumferential part 370. Here, at a location where the supply part 360a of the outer circumferential part 360 is not formed, a first outer circumferential part 362 formed from the upper side part to the lower side part, and a second outer circumferential part 364 formed from the lower side part to the upper side part are included. An upper portion of the second outer circumferential part 364 extends inside the first outer circumferential part 362. Further, the discharge part 366 is formed at a position where the first outer circumferential part 362 faces the second outer circumferential part 364. Further, while the wind supplied through the connecting duct 400 to the wind guide part 355 flows to the discharge part 366, the wind flow direction is changed towards the ground.

Figure 9:
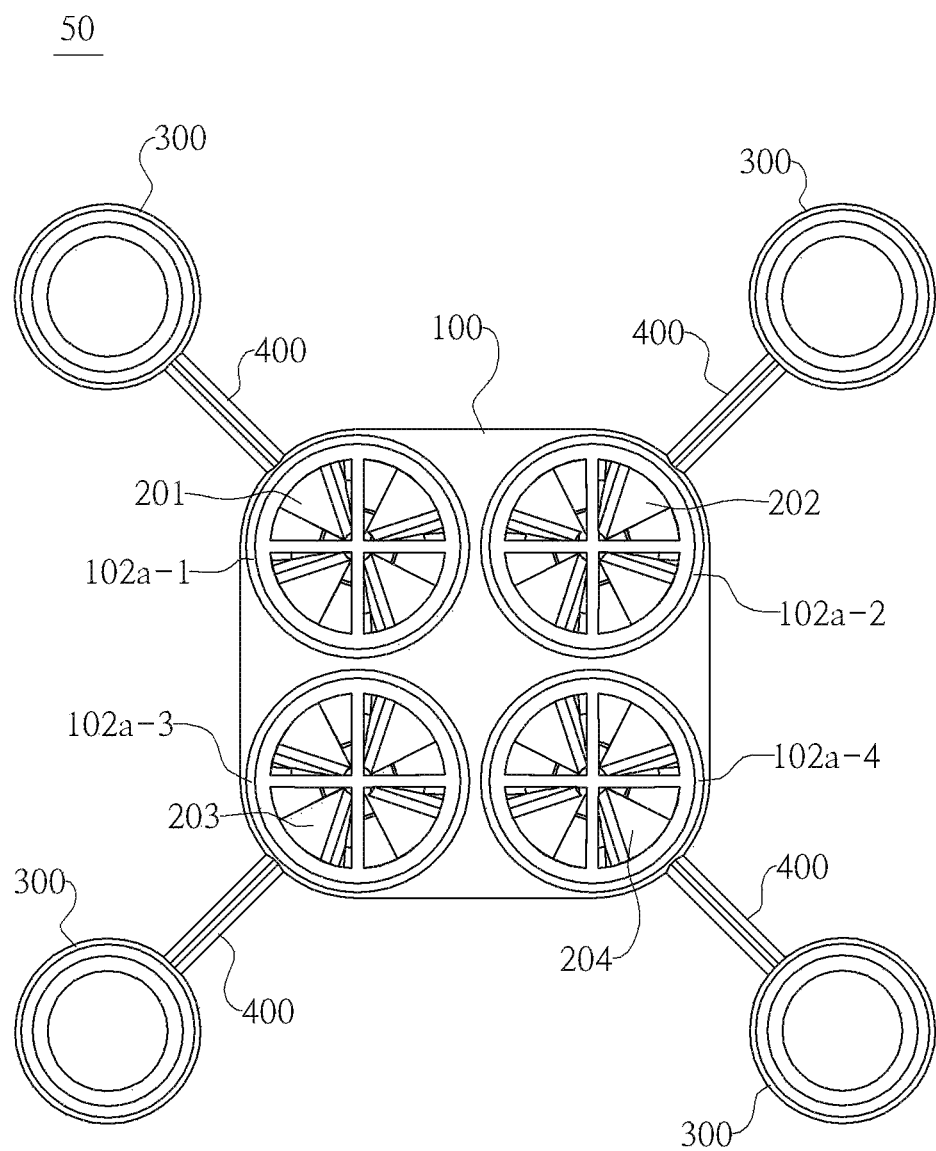
FIG. 9 is a view schematically illustrating a drone with a wind guide part according to a third preferred embodiment of the present invention.

FIG. 9 is a view schematically illustrating a drone with a wind guide part according to a third preferred embodiment of the present invention.

Referring to FIG. 9, the drone 50 with the wind guide part 300 according to the third preferred embodiment of the present invention is different from the first embodiment in the number of inlet units 201, 202, 203, and 204. That is, a plurality of inlet units 201, 202, 203, and 204 is provided to correspond to a plurality of wind guide parts 300 that are radially arranged along the outer circumference of the body 100. For example, if the number of the wind guide parts 300 is four, four inlet units 201, 202, 203, and 204 may be correspondingly provided to supply wind to the respective wind guide parts 300. In this regard, the interior of the body 100 is provided with a plurality of independent spaces (not shown), for example, four independent spaces, and the inlet units 201, 202, 203, and 204 are provided in the spaces, respectively. Further, inlet parts 102a-1, 102a-2, 102a-3 and 102a-4 are formed in upper portions of the spaces, respectively. Each wind guide part 300 is located outside the corresponding space to be spaced apart therefrom, and each connecting duct 400 is connected between each space and each wind guide part 300. Thus, for example, if four inlet units 201, 202, 203, and 204 are driven, outside air flows through four inlet parts 102a-1, 102a-2, 102a-3, and 102a-4 to four connecting ducts 400, respectively, and subsequently, four wind guide parts 300, respectively.

'As such, since the present invention has a plurality of inlet units 201, 202, 203, and 204 to supply wind to a plurality of wind guide parts 300, each wind guide part 300 has the effect of stably discharging stronger wind to a lower position.

'Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A drone with a wind guide, the drone comprising:
   a body;
   a single central inlet accommodated in the body, and comprising an inlet fan configured to generate wind to be introduced in the body;
   at least two pairs of wind guides, each wind guide being spaced apart from the body; and
   at least four connecting ducts, wherein
   each of the at least four connecting ducts is connected with a respective wind guide of the at least two pairs of wind guides, and configured to transmit the wind introduced from the single central inlet to the connected respective wind guide,
   each of the at least two pairs of wind guides is configured to apply lift force by discharging the wind transmitted from a respective connecting duct of the at least four connecting ducts, to allow the body to fly,
   an interior of the body comprises a first accommodation part disposed at an upper portion of the interior a second accommodation part disposed at a lower portion, a partition wall that separates the first accommodation part from the second accommodation part, and
   the first accommodation part is configured to introduce the wind and flow the introduced wind through the at least four connecting ducts to the at least two pairs of wind guides.

2. The drone as set forth in claim 1, wherein the at least two pairs of wind guides comprise a plurality of wind guides extending radially from the body to be spaced apart from each other.

3. The drone as set forth in claim 1, wherein each of the at least two pairs of wind guides comprises:
   a supply part receiving wind from the respective connecting duct of the at least four connecting ducts;
   a discharge part discharging the wind supplied to the supply part; and
   a wind passage formed between the supply part and the discharge part to allow the wind to flow therethrough.

4. The drone as set forth in claim 3, wherein each of the at least two pairs of wind guides is formed in a ring shape, and comprises an outer circumferential part provided on an outer circumference thereof, an inner circumferential part provided on an inner circumference thereof, an upper side part provided on an upper portion between the outer circumferential part and the inner circumferential part, and a lower side part provided on a lower portion between the outer circumferential part and the inner circumferential part, and
   the supply part is formed on the outer circumferential part, the discharge part is formed on the inner circumferential part, and the wind passage is provided between the outer circumferential part and the inner circumferential part.

5. The drone as set forth in claim 4, wherein the inner circumferential part comprises a first inner circumferential part formed in a direction from the upper side part to the lower side part, and a second inner circumferential part formed in a direction from the lower side part to the upper side part, and an upper portion of the second inner circumferential part extends inside the first inner circumferential part, and the discharge part is formed at a position where the first inner circumferential part faces the second inner circumferential part.

6. The drone as set forth in claim 5, wherein the second inner circumferential part is formed to be inclined towards the outer circumferential part, thus allowing wind to be obliquely discharged from the discharge part according to an inclination angle of the second inner circumferential part.

7. The drone as set forth in claim 6, wherein the inclination angle of the second inner circumferential part is formed such that it is closer to the outer circumferential part, as the second inner circumferential part approaches the supply part.

8. The drone as set forth in claim 5, wherein a lower end of the first inner circumferential part is formed to be closer to the second inner circumferential part.

9. The drone as set forth in claim 3, wherein each of the at least two pairs of wind guides is formed in a ring shape, and comprises an outer circumferential part provided on an outer circumference thereof, an inner circumferential part provided on an inner circumference thereof, an upper side part provided on an upper portion between the outer circumferential part and the inner circumferential part, a lower side part provided on a lower portion between the outer circumferential part and the inner circumferential part, and the wind passage provided in a space between the outer circumferential part and the inner circumferential part, and
   the supply part is formed on the outer circumferential part, and the discharge part is formed on the outer circumferential part or on the lower side part.

10. The drone as set forth in claim 1, wherein the single central inlet further comprises:
    an inlet motor rotating the inlet fan.

11. The drone as set forth in claim 1, wherein the single central inlet is configured to be controlled by wirelessly transmitted manipulation signal.

12. The drone as set forth in claim 1, further comprising at least four tilters,
    wherein each of the at least four tilters is positioned between one of the at least four connecting ducts and the respective wind guide of the at least two pairs of wind guides, and
    wherein the at least four tilters are configured to be tilted to adjust angles of the at least two pairs of wind guides.

13. The drone as set forth in claim 1, further comprising a battery installed in the second accommodation part for powering the single central inlet.

14. The drone as set forth in claim 1, further comprising at least four tilters,
    wherein each of the at least four tilters is positioned between the body and one of the at least four connecting ducts, and
    wherein the at least four tilters are configured to be tilted to adjust angles of the at least four connecting ducts.

\* \* \* \* \*